United States Patent Office 3,649,516
Patented Mar. 14, 1972

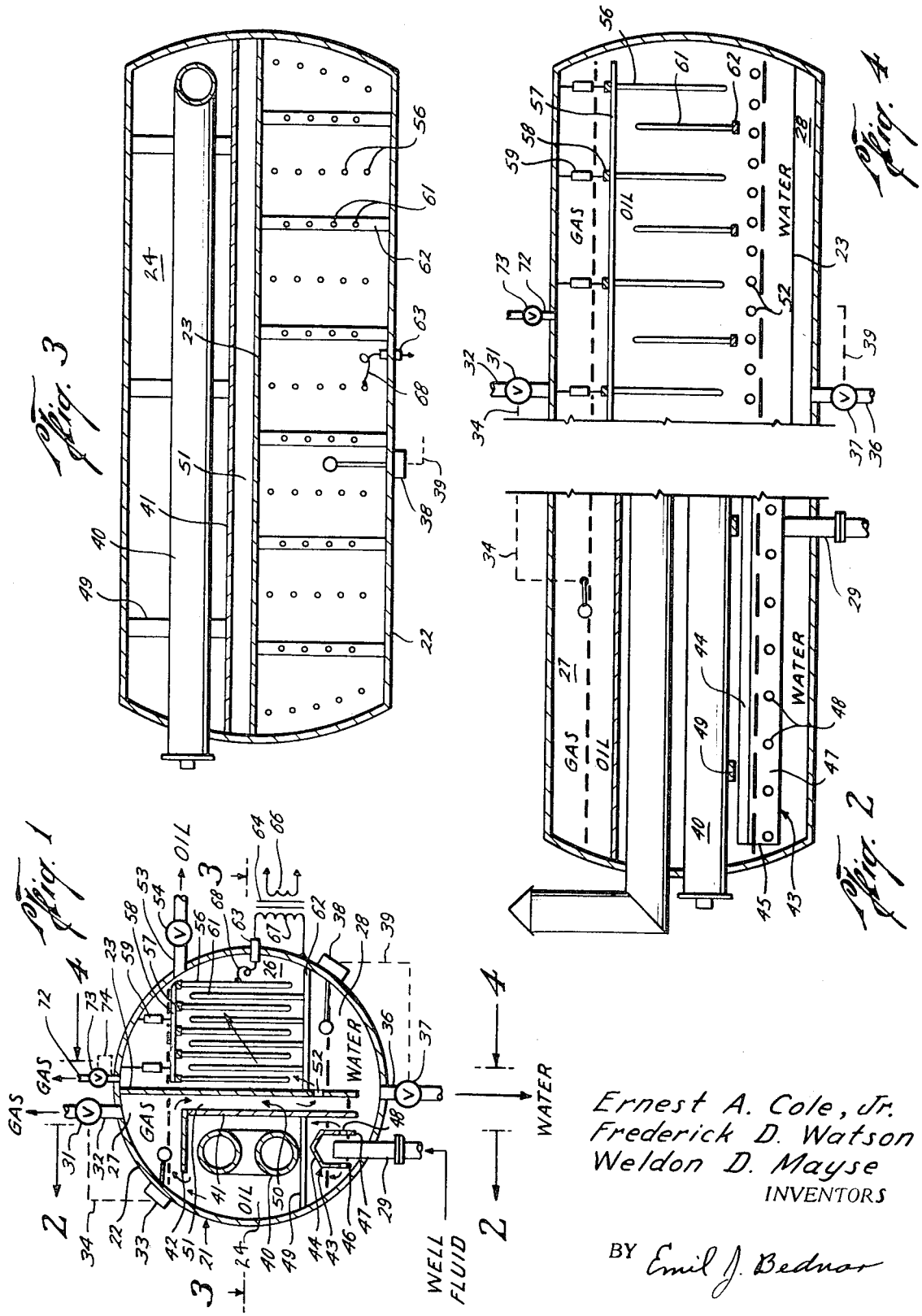

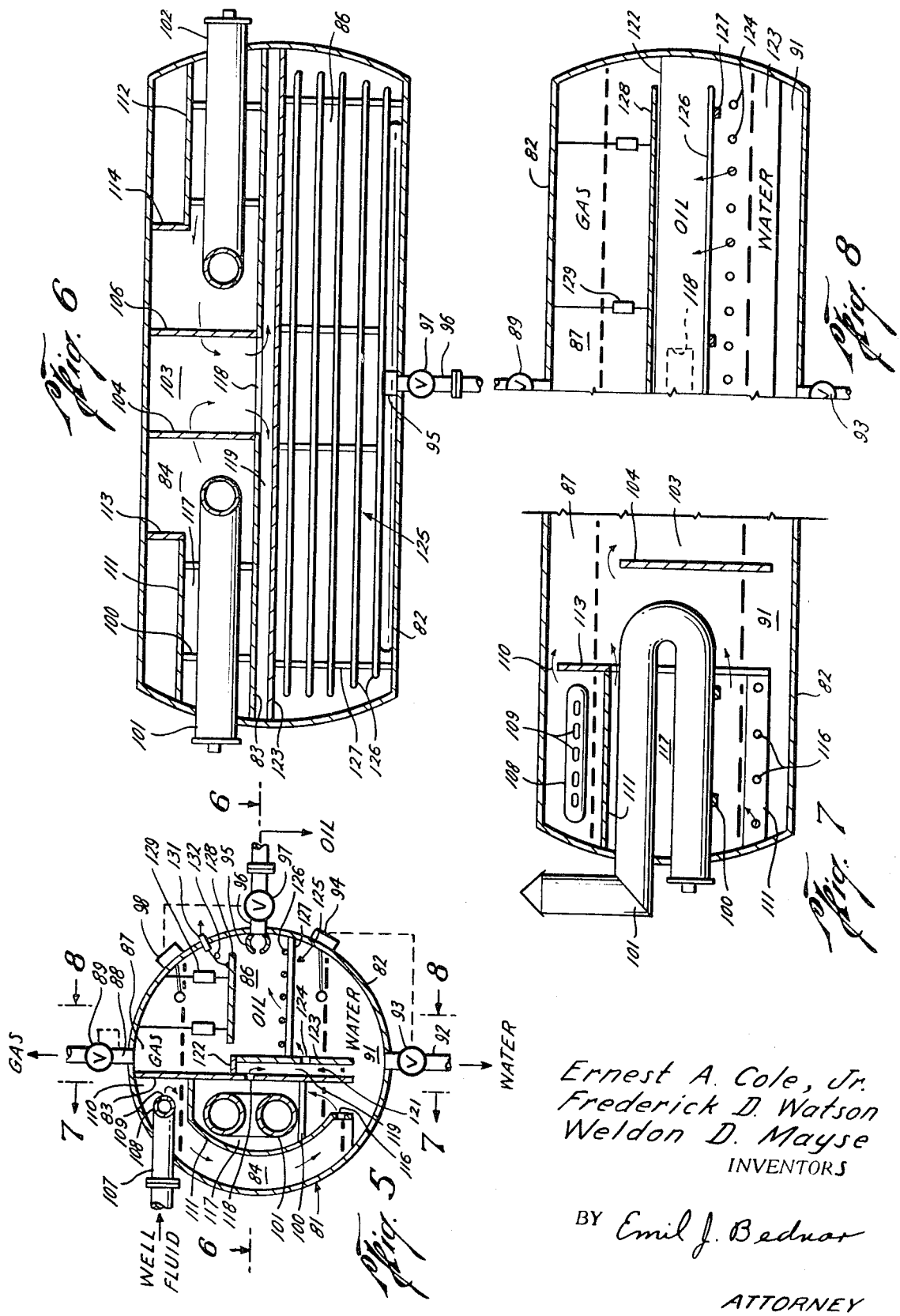

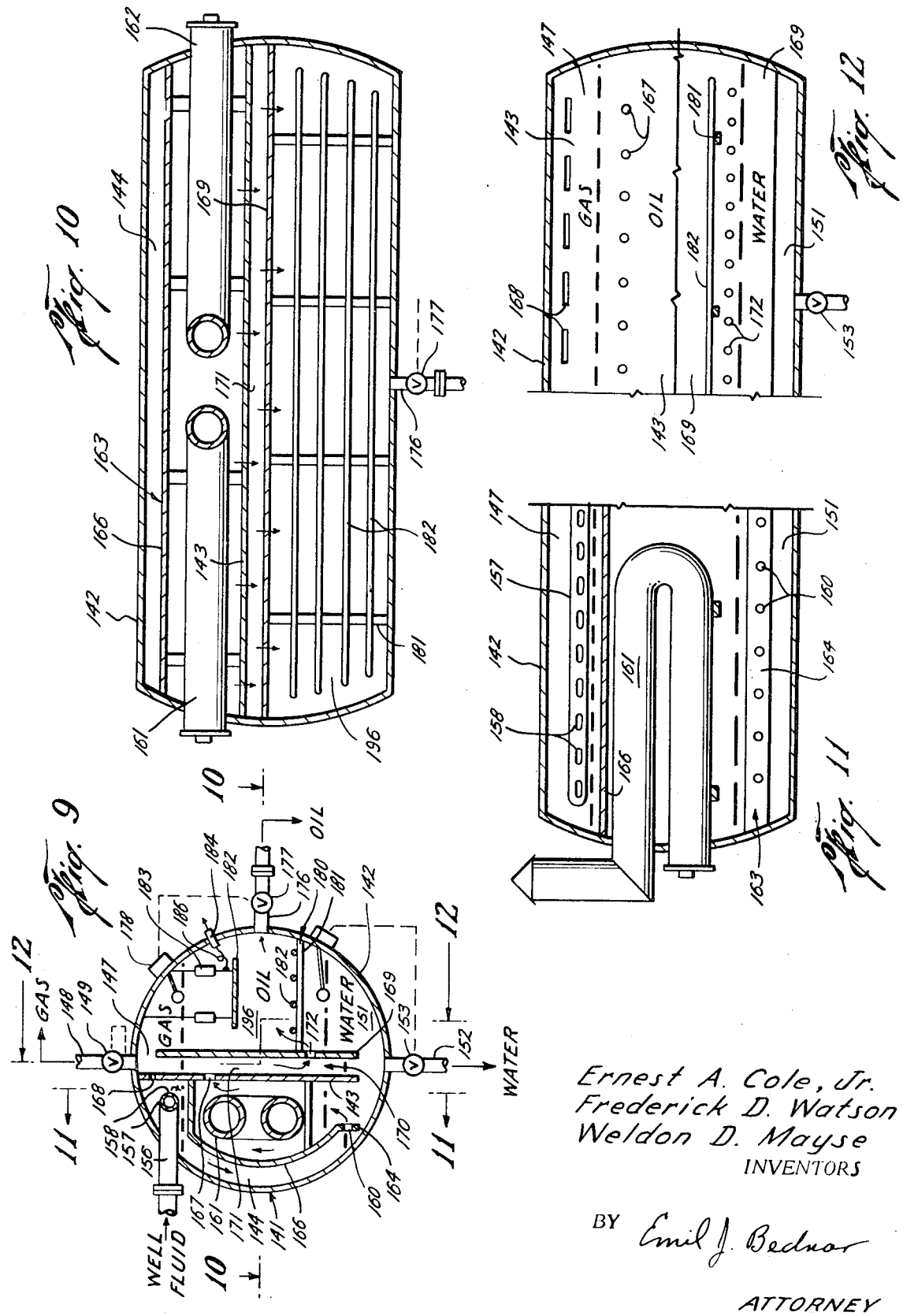

3,649,516
SEPARATOR WITH VESSEL-LENGTH PHASE SEPARATION SECTIONS
Ernest A. Cole, Jr., Frederick D. Watson, and Weldon D. Mayse, Houston, Tex., assignors to Petrolite Corporation, St. Louis, Mo.
Filed Sept. 28, 1970, Ser. No. 76,160
Int. Cl. B01k 1/00; C10g 33/02
U.S. Cl. 204—302                               31 Claims

ABSTRACT OF THE DISCLOSURE

A separator for oil-continuous emulsions containing gas and dispersed water phases. A closed horizontally-elongated vessel is divided into side-by-side inlet and outlet chambers by a vertical non-pressure baffle extending longitudinally within the vessel. Gas and water separation zones extend above and below the inlet and outlet chambers. Emulsion flows through the inlet chamber past a heater which promotes an initial separation of gas and water. Heated emulsion moves from the inlet chamber in a flow passage to a water sealed distributor which provides substantially uniform emulsion flows into the horizontal extent of the outlet chamber. Electrodes provide an electrical field for resolving the emulsion within the outlet chamber. An oil outlet removes the oil phase from the vessel on the side of the electric field opposite the distributor. Gas and water outlets remove these separated phases from the separation zones. The vessel-length separation sections need only gas and water level controllers to maintain all interfaces within the treater.

BACKGROUND OF THE INVENTION

(1) Field of the invention

This invention relates to the separation of oil-continuous emulsions containing gas and dispersed water phases, and in particular, to a treater employing in one vessel heating, electric field and gravity separation sections for resolving such emulsions.

(2) Description of the prior art

The separation of oil-continuous emulsions containing gas and dispersed water phases may be accomplished by any suitable phase separation mechanisms such as gravity settling, heating, chemical aids, and/or electric fields. In the oil industry, separation of these emulsions has been promoted by electric fields for over sixty years. In many instances, the emulsions may contain a very viscous oil phase which requires heating of the emulsion to reduce viscosity effects. Increased emulsion temperatures promote ready separation of the several phases, especially by the use of electric fields.

Less than a decade ago, the oil industry was faced with a serious problem of separating "difficult" emulsions in the oil fields. The crude oil production from subterranean formations through a well as a result of natural forces or in conjunction with secondary recovery techniques, such as water or gas injections and thermal stimulation techniques, resulted in very difficult-to-resolve emulsions. Many of these crude oil emulsions contained substantial gas and dispersed water phases but unfortunately, the crude oil continuous phase was of relatively high viscosity (and low API gravity). These emulsions could be treated by conventional techniques but required an assemblage of several apparatus to produce the heating, gas and water gravity separation, and electric field functions. Responsive to the great demand of the oil industry, an electric dehydrator was provided which combined the heating, degassing, dewatering and electric coalescing functions within one vessel. Electric dehydrators of this type are shown in U.S. Pats. 3,207,686 and 3,264,204. The electric dehydrators have been extensively employed within the oil industry with their designation as Chemelectric ® treaters, a registered trademark of Petrolite Corporation.

Electric dehydrators, of the type shown in these patents, have found universal acceptance in the oil industry not only within the United States but throughout the world. In these electric dehydrators, the emulsion is heated to the extent necessary that the electric treating section may resolve the emulsion into a pipeline acceptable crude oil wherein the continuous phase is substantially free of the gas phase and has only 1–3% residual dispersed water phase.

A recent demand was made by the oil industry for an "electric dehydrator" which not only provides the electric field resolution of an emulsion but which has the capabilities of supplying much greater amounts of heat to the emulsion that the unit can be operated as a conventional non-electric field heater-treater, if desired. For example, many oil fields are arranged for LACT systems of automated well production in which field the operators would desire an electric dehydrator or treater which has the capabilities of a heater-treater or as an electric treater by a very simple adaptation. For example, the electric treater may be capable of electrically resolving a certain number of barrels of oil emulsion per day. However, in the event of electrical power failure, or for other reasons the same device can operate without the electric field as a simple heater-treater by increasing greatly the available heat within the heating section (and with chemical aids) so that the same number of barrels of pipeline oil would be produced even though the cost of increased heating and chemicals would greatly exceed the electrical power otherwise consumed in normal operation.

Vessel-length heaters within conventional heater-treaters can be constructed. Additionally, in the conventional single-vessel contained heating, degassing and electric field functions, the heating section could be greatly increased to provide the same heating capacity on a barrelage basis as a conventional heater-treater. However, the vessel length for such increased heater capacity would be substantially greater than an equivalent conventional heater-treater by the volume of the electric field section in such a unit. The vessel cost and increased heater cost of the excessive vessel length do not permit such a construction. Alternatively, the vessel diameter could be increased to contain the additional heat capacity but this would provide an inefficient use of the fixed volume electric treating section within the vessel. Other arrangements such as by dividing a vessel by pressure-type baffles, and the like, could be designed but these again are faced with the increased vessel length and pressure baffle construction which would produce a combination of a conventional heater-treater with a conventional electric field at unacceptable expense. These constructions approach expensewise, separate vessels for the heater-treater and electric field section.

In U.S. Pat. 3,458,429, there is illustrated an electric treater for treating emulsion which employs a unique distributor, a water-sealed inverted trough. This distributor can provide a very uniform flow of emulsion into an electric field through the horizontal extent of the electric field. Therefore, the electric field, of a given horizontal extent, can treat a greater quantity of emulsion than by the use of any other types of distributor.

It is the purpose of this invention to produce an electric treater or separator, for resolving oil-continuous emulsions containing gas and dispersed water phases by combining heating, gas and water separating sections, and an electric field section within a single vessel without use of pressure-type baffles by a unique use of the inverted trough distributor. In addition, the separator of this invention, a given size vessel and emulsion capacity, will provide the heating capacity of a conventional heater-treater with a combination of an electric field section so that the combined heating, degassing and water separations are included compactly in the same vessel with the electric field section.

SUMMARY OF THE INVENTION

In accordance with this invention, there is provided a separator for oil-continuous emulsions containing gas and dispersed water phases. The separator comprises a closed horizontally-elongated vessel. Side-by-side inlet and outlet chambers, are formed in the vessel by a vertical non-pressure baffle extending throughout substantially the entire length of the vessel. Gas and water separation zones extend above and below these treating chambers. Separate outlets provide for removal of gas and water from these zones. The baffle has passageways adjacent the bottom of the vessel to provide unobstructed flow of water between the inlet and outlet chambers in the water separation zone. Emulsion enters the inlet chamber and passes over horizontally-elongated heater means. Flow passage means carry heated emulsion from the inlet chamber into the inlet zone of a water sealed distributor in the outlet chamber. The distributor extends horizontally substantially the length of the baffle and has imperforate enclosing members extending downwardly into the water separation zone to define an open-bottom inlet zone. One of the exterior members carries horizontally aligned passage means for delivering heated emulsion from the inlet zone into the outlet chamber at a horizon above the lower terminus of this exterior member. An electric field is established throughout the horizontal length of the outlet chamber. The electric field is interposed in the fluid flowing from the distributor to a third outlet for removing the oil phase from the vessel.

BRIEF DESCRIPTION OF THE DRAWINGS

FIG. 1 is a cross section of one embodiment of the separator of the present invention;

FIG. 2 is a partial-length vertical section taken along line 2—2 of the separator shown in FIG. 1;

FIG. 3 is a full-length, horizontal section taken along line 3—3 of the separator shown in FIG. 1;

FIG. 4 is a partial-length vertical section taken along line 4—4 of the separator shown in FIG. 1;

FIG. 5 is a cross section of another embodiment of the separator of this invention;

FIG. 6 is a full-length horizontal section taken along line 6—6 of the separator shown in FIG. 5;

FIG. 7 is a partial-length vertical section taken along line 7—7 of the separator shown in FIG. 5;

FIG. 8 is a partial-length vertical section taken along line 8—8 of the separator shown in FIG. 5;

FIG. 9 is a cross section of another embodiment of the separator of the present invention;

FIG. 10 is a full-length horizontal section taken along line 10—10 of the separator shown in FIG. 9;

FIG. 11 is a partial-length vertical section taken along line 11—11 of the separator shown in FIG. 9; and FIG. 12 is a partial-length vertical section taken along line 12—12 of the separator shown in FIG. 9.

DESCRIPTION OF SPECIFIC EMBODIMENTS

Referring now to FIGS. 1 through 4, there is shown a preferred embodiment of the separator of the present invention. The separator 21 is comprised of a horizontally elongated vessel 22 which is adapted to contain such fluid pressure as may be encountered in resolving oil-continuous emulsions which contain gas and dispersed water phases. The terminology oil-continuous emulsions as used herein is intended to include the emulsions encountered in well production fluids in oil fields and also to natural-occurring or synthetic emulsions such as created by an organic liquid as the continuous phase in which is dispersed an aqueous phase and/or a gas phase in solution or dispersed. It is also intended that this terminology specifically encompasses emulsions formed by relatively pure hydrocarbons, such as kerosene which may include a gas phase, a dispersed aqueous phase or both phases.

The vessel 22 may, for example, be required to contain the emulsion at a pressure of approximately 50 p.s.i.g. Other pressures may be contained safely in the vessel by suitable arrangement of wall thicknesses in accordance with conventional practices. A vertical non-pressure baffle 23 depends from the top of vessel 22 and extends longitudinally throughout substantially the entire length of the vessel 22. The baffle 23 forms side-by-side inlet and outlet treating chambers 24 and 26, respectively. A gas separation zone 27 resides above at least the inlet chamber 24 and extends longitudinally throughout the substantial entire length of the vessel 22. A water separation zone 28 extends longitudinally throughout substantially the entire length of the vessel 22 and resides below the inlet and outlet chambers 24 and 26, respectively. The water separation zone 28 seals the lower portion of the baffle 23 to the escape thereunder of either oil or gas phases. However, a passageway at the bottom of the baffle 23 provides unobstructed flow of water between the inlet and outlet chambers in the water separation zone 28. Emulsion enters the vessel 22 through an inlet 29 directly into the inlet chamber 24.

The gas separation zone 27 is maintained in the upper portion of the vessel 22 by any suitable means such as by a valve 31 contained within a gas outlet 32 mounted atop the vessel 22. The valve 31 is operated by a level controller 33 through a suitable connection indicated by chain line 34. The level controller 33 includes a float sensing the gas-emulsion interface within the inlet chamber 24 and actuates, responsively, the valve 31 permitting gas to be removed through the outlet 32 to maintain the gas separation zone above a selected horizon in the inlet chamber 24.

In the separator 21, the gas separation zone 27 resides only above the inlet chamber 24 since the vertical baffle 23 is imperforate in its upper portion and sealed to the top of the vessel 22. However, as will be observed later in the present description, the gas separation zone 27 could extend across the entire horizontal extent of the vessel 22.

The water separation zone 28 is maintained in the lower portion of the vessel 22 by any suitable means. For example, the emulsion-water interface is held at some suitable horizon in the vessel 22 by a valve 36 regulating the withdrawal of water from the bottom of the vessel 22 through outlet 37. The valve 36 is operated by a level controller 38 through an interconnection indicated by dashed line 39. The level controller 38 has a float to sense the water-emulsion interface in either the inlet or outlet chambers, as is desired, to maintain this interface at a preselected horizon in the vessel 22. However, it is preferred that the level controller 38 senses the water-emulsion interface above the water separation zone 28 in the outlet chamber. In this area, the gravity separation characteristics are better defined between a relatively purer oil (or emulsion) phase superimposed above the water separation zone.

The inlet chamber 24 contains an elongated heater 40 in spaced relationship to the gas and water separation zones. More particularly, the elongated heater 40 is preferably completely immersed within the emulsion. As can be seen in FIGS. 2 and 3, the heater 40 is a U-shaped tubing having longitudinal leg portions extending from one end of the vessel 22 horizontally through substantially the entire vessel 22 and a leg interconnecting elbow adjacent the other end of the vessel 22. If desired, shorter heaters may be employed which extend from both ends of the vessel towards the central portion as will be seen from the following description.

Preferably, the heater 40 is enclosed within a shroud so that the emulsion entering the inlet chamber 24 passes about the heater in a flow path promoting both direct and indirect heating. For this purpose, a vertical baffle 41 is provided between the baffle 23 and the heater 40. The baffle 41 extends downwardly from adjacent the gas separation zone 27 with its lower portion sealed by the water separation zone 28. The baffle 41 may have a short horizontal portion 42 extending over the heater 40 a small vertical distance below the gas separation zone 27. With this arrangement, the emulsion from the inlet 29 flows upwardly past the heater 40 and then is deflected horizontally towards the wall of the vessel 22. The directly heated emulsion then flows about the terminus of the horizontal portion 42 of the baffle 41 and downwardly into the space 51 between the vertical baffles 23 and 41.

The emulsion may flow from the inlet 29 through any type of distributor below the heater 40. However, an inverted trough type of distributor provides a uniform flow of emulsion throughout the horizontal extent of the heater 40. For this purpose, an inverted trough distributor 43 extending the length of heater 40 is provided above the inlet 29. In reference to FIGS. 1 and 2, distributor 43 has imperforate ends 45, sides 46 and 47, and top 44 members. The ends 45, and sides 46 and 47, project down into the water separation zone 28. As a result, the lower extremity of the distributor 43 is sealed by water during operation of the separator 21. The sides 46 and 47 carry above their lower extremities horizontally aligned passageways, such as spaced-apart, like size, round holes 48, which deliver the emulsion from the interior of the water-sealed distributor 43, through the water separation zone 28 and upwardly into the inlet chamber 24 about heater 40.

More particularly, the emulsion flow into the distributor 43 provides a slight increase in pressure across the holes 48 and results in the differential in height between the water-emulsion interfaces outside and inside of the trough distributor 43. This pressure differential may be only a few ounces of water but it is sufficient to drive the emulsion out of each of the holes 48 with uniform flows substantially identical in rate throughout the length of the distributor 43. This function of the water sealed distributor 43 provides a uniform distribution of the emulsion in upward flow throughout the horizontal length of the heater 40 within the inlet chamber 24. A greater direct and indirect heating efficiency is obtained over other distributors. If desired, the holes 48 may be provided only within the top member 44, or within any one or all of the members forming the distributor 43. The function of the holes 48 in response to the differential height in the water-interfaces about the distributor 43 is the same irrespective of the member in which they are formed.

For present purposes, the heater 40 is supported by mounting in one end of the vessel 22 and in its horizontal extent by several braces 49. Other arrangements of supporting the heater 40 may be employed if desired. A mixture of fuel and air is combusted in the lower leg of the heater 40 and the resultant gases pass from the other leg of an external vent stack. Thus, the B.t.u. capacity of the heater 40 may be regulated by adjustment of the mass of fuel consumed in combustion.

The space 51 between the vertical baffles 23 and 41 forms an inlet zone of a water sealed, inverted trough distributor 50. The space 51 opens upwardly into the inlet chamber 24 below the gas separation zone 27 and extends downwardly to a water seal provided by termination of the baffles within the water separation zone 28. The heated emulsion flows from the inlet chamber 24 over the horizontal portion 42 of the baffle 41 which forms a flow passage into the inlet zone 51 of the distributor formed by the spaced baffles 23 and 41. For this purpose, the baffle 23 is provided with horizontally aligned passage means, which may be a plurality of like-size round holes 52 which are best seen in reference to FIG. 4. More particularly, the emulsion flows downwardly through the inlet zone 51 and creates a slight pressure differential across the holes 52. This slight pressure differential as was described for the trough distributor 43, usually less than a few ounces of water, is represented by the differential in height between the water-emulsion interfaces between the vertical baffles and the outlet chamber. Thus, this arrangement provides a water-sealed inverted trough distributor in which the driving force for moving emulsion from the inlet zone 51 through the holes 52 into the outlet chamber 26 is uniform throughout the horizontal extent of the outlet chamber 26. As an example of the arrangement of the holes 52 within the baffle 23, the holes 52 may be spaced above the lower edge of the baffle 23 in an amount of 6 inches and have a ⅝ inch diameter with adjacent holes being spaced horizontally apart 6 inches. The driving force for moving emulsion through these holes may be of a value between ½ and 2 ounces of water pressure throughout the length of baffle 23. Thus, it can be readily seen that the fluid driving force is substantially equal across the holes 52 and results in a uniform inflow of emulsion throughout the horizontal extent of the outlet chamber 26.

The passage means represented by the round holes 52 in the vertical baffle 23 may be equally provided by other types of horizontally aligned openings. For example, the openings may be provided by a continuous or interrupted slots, by oval, round, triangular or other shaped openings provided they have substantially the same area open to fluid distribution and are uniformly spaced throughout the horizontal extent of the outlet chamber 26. In this manner, a given pressure differential across like area-openings will provide like-uniform flows substantially throughout the extent of such openings in the baffle 23.

It will be apparent that the lower portion of inlet zone 51 of the vertical baffles may be connected by passageways into a separate distributor, such as the inverted trough distributor 43. For example, a second distributor (like 43) may have the side 46 open or directly connected fluidwise through the lower portion of the vertical baffle 23. Other arrangements to provide similar functioning of a separate water sealed distributor receiving emulsion from inlet zone 51 will be apparent from the here-inafter described embodiments of the present invention relative to FIGS. 5–12.

The emulsion entering the outlet chamber 26 from the holes 52 in the baffle 23 is passed through an electric field for its ultimate resolution into a purified oil continuous phase. The purified oil phase is removed through one or more outlets 53 carried in the wall of the vessel 22. Preferably, the outlet 53 is diametrically opposite the electric field from the holes 52 through which emulsion enters into the outlet chamber 26. In this manner the emulsion must flow substantially horizontally through the electric field provided in the outlet chamber 26.

The electric field within the outlet chamber 26 may be provided by any suitable means which can effectively treat the emulsion passing upwardly from the holes 52 towards the outlet 53. The electric field can be produced by using spaced-apart, vertical rod electrodes which are mounted in horizontal patterns in the outlet chamber 26. More particularly, a set of energized rod electrodes 56 are suspended from longitudinal members 57 and held in an array by transverse members 58 suspended from the vessel 22 by insulators 59. In a similar fashion, the grounded vertical electrodes 61 are supported in an array on a plurality of transverse support members 62 mounted between the wall of the vessel 22 and the vertical baffle 23. The electrodes 56 and 61 are equally spaced from one another to create a substantially uniform field throughout the horizontal cross section of the outlet chamber 26. Preferably, the electrodes are positioned in a regular geometric pattern. For example, the energized electrode 56 may be in the center of a rectangle formed by four grounded electrodes, and each of these basic rectangular patterns is repeated into the ultimate pattern wherein adjacent electrodes of each pattern are represented by grounded and energized vertical electrodes.

An entrance bushing 63 permits connection of the energized electrodes 56 to an external source of high voltage which can be a transformer 64 having a primary 66 connected to a suitable source of power. A high voltage winding 67 of the transformer connects at one terminal to the vessel 22 and the other terminal passes current through the entrance bushing 63 and lead 68 to the electrodes 56. Although the high voltage is indicated to be an AC potential, it is envisioned that the separator 21 may be operated on DC potentials adequate to resolve the emulsion.

The emulsion passes into the electric field created about the electrodes 56 and 61 and is therein resolved to a completeness required by subsequent uses of the purified oil phase. The coalesced water falls from the electric field downwardly into the water separation zone 28. The oil-continuous phase, containing little or no dispersed water phase, passes from the electric field into the outlet 53 and then may be passed to any suitable utilization. The outlet 53 provides sufficient backpressure upon the separator 21 to maintain the contents in the electric field within outlet chamber 26 in a substantially liquid phase at the desired operating conditions. A valve 54 may be provided in the outlet 53 to maintain a suitable backpressure within the treater 21. For example, the valve 54 may be adjusted at the operating conditions within the outlet chamber 26 to maintain sufficient backpressure to prevent any release of residual dissolved gasses therein.

A small amount of gas may accumulate in the uppermost portions of the vessel 22 adjacent the baffle 23 but yet not interfere with the proper operation of the separator 21. However, the gas-oil (emulsion) interface within the upper portion of the vessel 22 must not fall below the insulators 59 and come into contact with the energized electrode 56. Otherwise, a gas corona effect may interfere with the proper operation of the separator, or for other proper operating reasons. It is preferable to maintain the insulators 59 entirely submerged within the oil-continuous phase with all residul gas being held above the uppermost portions of the insulators 59. Any means for removing such entrapped gas may be provided in the vessel 22. For this purpose, an outlet 72 removes the gas from the vessel 22 with a valve 73 regulating the outflow of gas. The valve 73 may be actuated manually or automatically by a gas vent connection 74 sensing the presence of free gas immediately below the outlet 72.

It will be apparent from the foregoing description that the separator 21 has a heater 40 extending vessel length. A vertical or sloped substantially equal to vertical in function, non-pressure baffle divides the vessel into approximately equal volume inlet and outlet chambers. Compared to the electric treaters Pats. 3,207,686 and 3,264,204 earlier mentioned, it will be noted that the electric field in separator 21 occupies a proportionally smaller space relative to the heater capacity than in the prior units. This novel arrangement in separator 21 is permitted principally by the water sealed distributor 50 distributing heated emulsion substantially uniformly throughout the horizontal extent of the electric field in the outlet chamber 26. Thus, the electric field is in its best environment for resolving efficiently the heated emulsion.

The operation of separator 21 demonstrates many advantages. The emulsion enters the inlet 29 and flows from the distributor 43 at substantially uniform rates through out the horizontal extent of the heater 40. The heated emulsion reverses directions as it passes about the horizontal portion 42 of the vertical baffle 41 into inlet zone 51 of the water sealed distributor 50. The heated emulsion before entering inlet zone 51 is substantially degassed and substantial quantities of water fall from the emulsion into the water separation zone 28. Gas separated from the heated emulsion passes upwardly into the gas separation zone 27. The heated emulsion passes downwardly into the inlet zone 51 of the water sealed distributor which also tends to release additional quantities of water which fall between the vertical baffles 23 and 41 and into the water separation zone 28. The heated emulsion then makes a right-angle turn to flow through the holes 52 into the electric field in the outlet chamber 26 wherein electrical resolution provides a substantially purified oil-continuous phase which is removed through the outlet 53.

In this embodiment, the emulsion flow through the distributors 43 and 50 is maintained substantially uniform throughout the horizontal extent of the vessel 22 by employing the water sealing effects of the water separation zone 28 in a type of inverted trough distributor. As the rate of emulsion flow changes, so does the differential in height between the water emulsion interfaces exteriorly and interiorly of these distributors. Thus, substantially uniform flow conditions are maintained throughout the horizontal extent of the electric treater 21 irrespective of emulsion flow rate. The heating, degassing, water separation and electric field resolution of the emulsion is optimized in the separator 21. This arrangement also permits the use of a relatively smaller horizontal section of the electric field, within a given size vessel 22, for a larger inlet chamber containing the heater 40. Stated in another manner, a much larger heater 40 can be placed within the same vessel containing an electric field as compared to the prior constructions of electric dehydrators.

The heater 40 has a B.t.u. capacity that the separator 21 can be operated as a heater-treater without energization of the electrodes with this present embodiment. For example, a crude oil emulsion may be adequately resolved by heating the incoming emulsion from an ambient temperature (e.g., 90° F.) to approximately 180° F. (with additional chemicals aids, if desired) and the outlet chamber 26 now serves only as a gravity settler to produce an acceptable oil-phase removed from the outlet 53. However, when the electrodes 56 are energized, the temperature of the heated emulsion within the inlet chamber 24 is much lower, for example, 135° F. Obviously, this lower temperature saves about one-half the B.t.u.'s consumed in heating the emulsion from 135° F. to 190° F. Even at this reduced temperature of the emulsion, the electric field in the outlet chamber can adequately produce an acceptable oil-continuous phase removed from the outlet 53. The oil phase is on utilization is acceptable where it is of pipeline quantity e.g., having less than 3.0% (vol.) B.S.&W.

Where it is desired to operate automatically in a dual manner, such as upon a power failure to the transformer 64, the amount of combustile fuel used in the heater 40 is increased to elevate the temperature within the inlet chamber 24 a sufficient amount whereby the emulsion flowing through the unit is acceptably resolved by thermal and gravity settling effects without the assistance of an electrical field. Then, energization of the transformer 64 reduces the fuel consumed in the heater 40 thereby lowering the temperature of the emulsion within the inlet chamber 24 to a selected value at which the emulsion can again be resolved adequately by the electric field. Thus, the present separator 21 serves selectively as a heater-treater employing only heating and gravity settling effects and as the more acceptable combined sections of heating, degassing, removal of water and an electric field in a single vessel. Thus, the advantages of both types of equipment are obtained in a single vessel which may be dimensioned no greater than conventional vessels of the same treating capacity. However, the separator 21 employs a much smaller electric field section compared to a much larger heating section in the inlet chamber 24 than conventional equipment.

Referring now to FIGS. 5, 6 and 7, there is shown another embodiment of a separator of the present invention. The separator 81 is similar to the separator 21 previously described but incorporates certain other additional features which may be desired to be employed in certain installations. For example, the separator 81 has a superimposed gas separation zone which extends substantially throughout the entire top portion of the vessel. In addition, the incoming emulsion is distributed through the gas phase into the emulsion body heated by a pair of heaters within the inlet chamber.

More particularly, the electric treater 81 provides for the resolution of oil-continuous emulsions containing gas and dispersed water phases employing a closed horizontally elongated vessel 82. A vertical non-pressure baffle 83 extends longitudinally throughout substantially the entire length of the vessel 82 and at near its midline. This baffle forms side-by-side inlet and outlet chambers 84 and 86, respectively. The baffle 83 extends downwardly from the top of the vessel 82 to a point spaced a short distance from the bottom of the vessel 82 so as to provide a passageway for fluid connection therebeneath. A gas separation zone 87 is maintained in the upper portion of the horizontal and longitudinal extent of the vessel 82 by regulating the outflow of accumulating gas through an outlet 88. A valve 89 regulates flow in outlet 88 in any suitable fashion, such as by backpressure operation. A water separation zone 91 extends throughout substantially the horizontal and longitudinal extent of the vessel 82. The zone 91 water seals the bottom portion of the vertical baffle 83 against flows of emulsion and gas phases beneath its lower extremity. The water-emulsion interface of the water separation zone 91 is maintained at a selected horizon by the controlled removal of water through the outlet 92. A valve 93 in outlet 92 may be actuated by a level controller 94 which employs a float to sense the water-emulsion interface of the water separation zone 9. The gas-oil (emulsion) interface within the outlet chamber 86 is maintained at a relatively constant horizon by the controlled removal of such fluid through an outlet 96. A valve 97 in outlet 96 may be actuated by a level controller 98 employing a float to sense the gas-oil interface of the oil-continuous body. The outlet 96 may connect to a longitudinal, horizontal outlet collector 95 carried on the wall of vessel 82. Thus, the gas within the gas separation zone 87 may be removed in response to a certain backpressure operating the valve 89 in conventional fashion.

The inlet chamber 84 contains heaters 101 and 102 which extend horizontally into opposite ends of the vessel 82 and rest upon supports 100. If desired, a single vessel-length heater such as was described relative to the embodiment of FIGS. 1–4 may be employed. An outlet zone 103 in the inlet chamber 84 between the heaters 101 and 102 is defined by one or more transverse baffles 104 and 106 which extend downwardly from a point below the gas separation zone 87 into the water separation zone 91. As a result, fluid flowing about the heaters 101 and 102 and passing longitudinally towards the center of the vessel 82 must flow over the baffles 104 and 106 into the outlet zone 103.

The emulsion may be introduced into the inlet chamber 84 by any suitable distributor means. It is preferred to connect an inlet 107 through one or more longitudinal distributors 108 to introduce emulsion into the gas separation zone 87 directly above the heaters 101 and 102. The emulsion flows from the distributors through openings 109 which may be round holes or other opening configurations suitable for this purpose. The emulsion distributors are superimposed on open-bottom shrouds 111 and 112 which enclose the heaters 101 and 102, respectively. The shrouds extend outwardly from the vertical baffle 83 and turn downwardly about the heaters into the water separation zone 94 which seals their open bottoms. The shrouds are sealed (except for gas ports 110) at their interior ends by circumferential segments 113 and 114 to the side walls of the vessel 82. The emulsion flows with indirect heating from the distribtuors downwardly into the segment annuli about the shrouds 111 and 112. Then, the emulsion flows through openings 116 in the shrouds into the fluid-isolated heating zone 117 surrounding the heaters 101 and 102. As can be seen in FIG. 5, the emulsion passing through the openings 116 does so in response to a small pressure differential caused by the difference in height of the water-emulsion interfaces on each side of the shrouds 111 and 112. This pressure differential caused by the differential heights of the water-interfaces need be only a few ounces of water pressure. The holes 116 are spaced substantially throughout the length of the heaters 101 and 102 to provide for a vessel-length uniform flow of emulsion into the heating zone 117. Other forms of distributing the emulsion from the annulus between the shroud 111 and the side wall of the vessel 82 into the heating zone 117 may be employed, if desired. The emulsion in the heating zone 117 is brought to a desired elevated temperature by a heating fluid passed through the heaters 101 and 102. A mixture of natural gas and air upon combustion can supply the desired amount of heating of the emulsion in the treater 81. The heated emulsion passes longitudinally from the heaters over the baffles 104 and 106 into the outlet zone 103.

From the outlet zone 103 of the inlet chamber 84, the heated emulsion passes through an opening 118 in the vertical baffle 83 (opening 118 is shown in FIGS. 6 and 8) into an inlet zone 119 within a distribtuor 121 carried in the outlet chamber 86 of the vessel 82. The water-sealed distributor 121 extends horizontally vessel length. It is of an inverted trough type which is provided on one side by the imperforate wall of the baffle 83 adjacent the water separation zone 91, an imperforate top 122 and side member 123 which extends downwardly into the water separation zone 91. The inlet zone 119 of the distributor 121 has an open-bottom sealed by the water separation zone 91. The side member 123 carries horizontally aligned passage means such as like-size round openings 124 to deliver the heated emulsion from the inlet zone 119 into the outlet chamber 86 at a horizon spaced above the lower terminus of the side member 123. As a result, the heated emulsion in the inlet zone 119 is moved through the holes 124 by a small pressure differential reflected by the differential heights of the water-emulsion interfaces associated with the water-sealed distributor 121. A force of only a few ounces of water pressure moves the heated emulsion through the holes at a substantially uniform flow through holes 124 throughout the entire horizontal extent of the outlet chamber 86.

It will be apparent that the opening 118 in the vertical baffle 83 provides a flow passage interconnecting the outlet zone 103 of the inlet chamber 84 with the inlet zone 119 of the distributor 121 in the outlet zone 86. However, other structures may move heated fluid from about the isolated heated zone 117 into the outlet chamber 86.

The outlet chamber 86 is provided with an electric field of sufficient intensity to resolve the heated emulsion into an oil-continuous phase which is removed through the outlet 96. The water coalesced from the emulsion within the electric field falls into the water separation zone 91. Gas released in the separator 81 passes upwardly in to the gas separation zone 87. A gas vent in the baffle 83 adjacent the top of the vessel 82 permits the flow of gas at substantially no backpressure between the inlet and outlet chambers.

The internal arrangement of the vessel 82 provides no substantial pressure differential to movement of the emulsion being treated. Thus, the separator 81 operates with a relatively small pressure differential between inlet and outlets as only is required to move fluid through its various heating, degassing, water removal and electric treating sections.

The electric field in the outlet chamber 86 may be provided by any suitable means. The electric field described for the preceding embodiment relative to FIGS. 1 through 4 can be used. Good results may be obtained by using upper and lower planar electrodes mounted horizontally in the outlet chamber 86. These electrodes are energized from an external source of high potential for creating the high voltage electric field in the innerelectrode space. More particularly, a lower planar electrode 125 is formed by longitudinally extending metal rods 126 mounted upon transverse horizontal supports 127 which are connected to the wall of the vessel 82 and member 123. The energized electrode may be a like arrangement of rods and supports. Alternatively, the upper electrode 128 can be a flat metal plate which is suspended by insulators 129 from the upper surface of the vessel 82. The electrode 128 is energized from any suitable source, such as transformer 64 described in the preceding embodiment, by electrical connection effected through an entrance bushing 131 and a flexible lead 132 to the electrode. Thus, the high voltage applied to the electrode 128 creates an electric field in the innerelectrode space in the outlet chamber 86.

The heated emulsion passes from the openings 124 of the distributor 123 upwardly through the foraminous grounded electrode 125 into the innerelectrode space beneath the energized electrode 128. The electric field resolves the emulsion into an oil-continuous phase which passes from the outlet 96 to any utilization. The emulsion must pass horizontally substantially throughout the entire electric field in the innerelectrode space since electrode 128 is imperforate. This horizontal flow path provides for highly efficient resolution of the emulsion within the electric field.

The separator 81 provides several advantages in passage of the emulsion from the distributor 108 downwardly about the shrouds 111 and 112 in the inlet chamber 84. This flow circuit permits a substantial degassing of the emulsion prior to its being indirectly heated on the convex side of the shrouds. In addition, the reversal of flow of the emulsion passing through the openings 116 into the heating zone 117 produces a ready disengagement of water loosely carried in the emulsion partially heated. Heating directly the emulsion about the heaters 101 and 102 causes substantially all of the gas phase to be released. Also, intense direct heating induces further water separation as the heated emulsion falls longitudinally from the heaters over the baffles 104 and 106 into the outlet zone 103 in the inlet chamber 84. This reversal of flow direction disengages additional quantities of residual gas and water phases from the heated emulsion. Thus, the heated emulsion which passes from the water-sealed distributor 123 into the electric field within the outlet chamber 86 has been preconditioned intensively. As a result, the electric field produces a highly efficient ultimate resolution of any remaining dispersed water from a relatively pure oil-continuous phase. The separator 81 may be equipped with only a single vessel-length heater such as shown in the first described embodiment of FIGS. 1-4. For this purpose, the single heater would extend from one end of the vessel to adjacent the other end but terminating a short distance to accommodate a transverse baffle 104 thereby forming an outlet chamber 103. It will be apparent that the features of the first described embodiment in separator 21 may be used with the separator 81 if such an arrangement is desired.

Referring now to FIGS. 9 through 12, there is shown another embodiment of the separator of this invention which embodies additional features not found in the first two described embodiments. The separator 141 is well adapted for separating oil-continuous emulsions containing gas and dispersed water phases. The separator 141 is formed of a closed-horizontally elongated vessel 142. A vertical non-pressure baffle 143 extends longitudinally substantially the entire length of the vessel 142. The baffle 143 forms side-by-side inlet and outlet treating chambers 144 and 146, respectively. The baffle 143 extends downwardly from the top of the vessel 142 and terminates in a spaced-relationship to the bottom of the vessel 142 thereby providing an unobstructed passageway for fluids to flow below its lower extremity. A gas separation zone 147 is maintained substantially throughout the horizontal extent of the entire length of the vessel 142 by any suitable means. Gas accumulating in the gas separation zone 147 may be removed to maintain a given pressure within the vessel 142. For this purpose, the outlet 148 is controlled by a back pressure valve 149. A water separation zone 151 is maintained throughout the horizontal extent of the baffle 143. The water separation zone 151 is maintained in any suitable fashion such as by removing water through an outlet 152 in regulated amounts. A valve 153 in outlet 152 is actuated by a level controller 154 which employs a float to sense the water-emulsion interface of the water separation zone 151.

Emulsion enters into the vessel 142 by an inlet 156 which connects to an emulsion distributor 157 mounted horizontally in the upper portion in the inlet chamber 144. The distributor 157 carries openings 158 and extends substantially throughout the length of the vessel 142. One or more horizontally elongated heaters are contained in the inlet chamber 144. The heater may be a single vessel-length heating tube. Preferably, a pair of heaters 161 and 162 are formed by parallel tubes extending horizontally from the ends of the vessel 142 towards its center and terminating in close proximity to one another. A pair of heaters is of advantage in vessel lengths of several dozen feet. These heaters can be supplied heat energy from any suitable source such as by a combustible mixture of fuel and oxidizing gas. The heaters 161 and 162 are enclosed by an open-bottom shroud 163 which resides below the distributor 157. The shroud 163 has an imperforate member 164. The member 164 extends downwardly into the water separation zone 151 which forms a water seal against the passage of emulsion or gas beneath its lower extremity. The shroud 163 carries a plurality of horizontally aligned passage means which may be like-size round holes 160. The holes 160 are spaced uniformly throughout the lower horizontal extent of the member 164 but above its lower terminus.

The flow of emulsion through holes 160 is in response to a small pressure differential which is reflected by the differential heights of the water-emulsion interfaces to each side of member 164. Thus, the arrangement is an inverted trough distributor like in the preceding embodiment of separator 81.

The flow of emulsion from openings 158 in the distributor 157 and about the shroud 163 in an indirect heat exchange relationship to provide an initial disengagement of gas and water. The partially heated emulsion then flows from the openings 160 upwardly about the heaters 161 and 162 in a direct heat exchange relationship. Further quantities of gas and substantial quantities of water may be released from the heated emulsion. The heated emulsion passes through passage means contained in the vertical baffle 143 into a distributor inlet zone 171. The passage means can be a plurality of like-size round openings 167 which distributed heated emulsion uniformly along the horizontal extent of the baffle 143. Any gas released upon the flow of the heated emulsion through the openings 167 passes upwardly into the gas separation zone 147. For this purpose, the vertical baffle 143 has a plurality of gas ports 168 contained adjacent the top of the vessel 142. These ports equalize the gas pressure above the inlet and outlet chambers. As a result, a uniform gas-emulsion interface is maintained throughout the length of the vessel 142.

A second vertical non-pressure baffle 169 extends longitudinally throughout the entire length of the vessel 142. The baffle 169 is spaced a short distance from the baffle 143. The baffle 169 extends downwardly from the gas separation zone 147 into the water separation zone 151 and terminates along side of baffle 143. The top of the baffle 169 is spaced a sufficient distance below the top of the vessel 142 to permit the free passage of gas thereabove. The parallel baffles 143 and 169 form an inlet zone 171 which is connected to the inlet chamber 144 by the flow passage provided by the openings 167. Thus, the heated emulsion flows downwardly into the inlet zone 171 into a water-sealed inverted trough distributor 170 similar to that employed in the preceding described embodiments of separator 21 and 81

In the distributor 170, the baffle 169 carries above its bottom edge horizontally aligned passage means which may be a plurality of openings 172 for delivery of the heated emulsion from the inlet zone 171 into the outlet chamber 146. The openings 172 may be of any form but preferably are like-size, round openings spaced at uniform distances in the same horizontal plane throughout the length of the vertical baffle 169. In as much as the bottom of the baffle 169 is sealed by the water separation zone 151, the flow of emulsion into the inlet zone 171 creates a small pressure differential which moves the flow of fluids through the openings 172. This fluid driving force causes differential heights between the water-emulsion interfaces within the water distributor and exteriorly thereof in the outlet chamber 146. By this means, the heated emulsion is distributed uniformly from the holes 172 throughout the horizontal extent of the outlet chamber 146.

The outlet chamber 146 contains an electric field capable of resolving the heated emulsion into a relatively pure oil-continuous phase which is removed from an outlet 176. A valve 177 regulates flow in outlet 176 using a level controller 178 which senses the gas-emulsion interface in the outlet chamber 146 by a float or other means. The oil phase removed through the outlet 176 may be passed to any suitable utilization. The electric field in the outlet separation zone may be provided by any suitable means. However, it is preferred to use a pair of spaced-apart upper and lower planar electrodes mounted horizontally in the outlet chamber 146. For this purpose, a grounded electrode 180 is carried upon transverse horizontal supports 181 and may take the form of longitudinally extending metal rods 182. The foraminous grounded electrode 180 passes the heated emulsion from the openings 172 into the innerelectrode space provided beneath an energized electrode 182. The energerized electrode 182 may take any form but preferably is a solid metal plate suspended on insulators 183 from the top of the vessel 142. The electrode 183 is energized from any suitable source of high potential such as the transformer 64 described relative to the separator 21 of FIGS. 1 through 4. The source of high potential current is applied through an entrance bushing 184 and a conducting lead 186 to the energized electrode 182. As a result, an electric field is created in the innerelectrode space between the electrodes 182 and 181 in the outlet chamber 146. This electric field is of sufficient intensity for securing the resolution of the heated emulsion which passes substantially horizontally between these electrodes to the outlet 176.

The holes 172 in the vertical baffle 169 may be placed in any vertical position relative to the electrodes as is desired. However, it is preferred to introduce the heated emulsion closely adjacent the grounded electrode. In this arrangement, the emulsion must flow in a path substantially horizontally through the electric field toward the outlet 176.

The separator 141 has vessel-length inlet and outlet chambers wherein an emulsion may be resolved either by a combination of heating, degassing, removal of water in conjunction with electric field treatment or solely by gravitational separation effects effected by heating the incoming emulsion to a sufficient temperature where similar results may be obtained. More particularly, the heaters 161 and 162 are vessel-length coextensive to the gas and water separation zones 147 and 151, respectively. Additionally, the electric field is vessel-length but only occupies a relatively small portion of the horizontal cross section of the vessel compared to the enlarged heated section. The pressure drop in flowing the emulsion through the separator 141 is relatively small because all fluid distributors are water sealed and operate as types of inverted trough distributors.

It will be apparent from all the foregoing described embodiments of the separators of this invention, the vertical baffles may divide the vessels into equal sections taken along a vertical plane bisecting the longitudinal axis of the vessel. However, it is to be understood that these vertical baffles may be placed slightly to one side or the other of the medial line of the vessel without significant loss of emulsion resolution efficiency. The present arrangement of the separators function not only to divide emulsion treatment sections with a non-pressure baffle, but also to provide water-sealed distributor functions. As a result, an electric dehydrator containing heating, degassing and water separation sections may be combined in a vessel in such a fashion that the heating section may be made so large that the unit will function as a heater-treater without the application of an electric field to assist coalescence in the outlet chamber. Other advantages will be obvious from a review of the structures which have herein been described.

Various modifications and alterations in the described separators will be apparent to those skilled in the art from the foregoing description which do not depart from the spirit of the invention. For this reason, these changes are desired to be included within the scope of the appended claims. The apended claims define the present invention; the foregoing description is to be employed for setting forth the present embodiments as illustrative in nature.

What is claimed is:

1. A separator for oil-continuous emulsions containing gases and a dispersed water phase, said separator comprising:
   (a) a closed horizontally-elongated vessel;
   (b) a vertical non-pressure baffle extending longitudinally throughout substantially the entire length of said vessel, said baffle forming side-by-side inlet and outlet treating chambers;
   (c) means for maintaining a gas separation zone extending longitudinally throughout substantially the entire length of said vessel, and said gas separation zone residing at least above said inlet chamber,
   (d) means for maintaining a water separation zone extending longitudinally throughout substantially the entire length of said vessel, and said water separation zone residing below said inlet and outlet chambers and sealing the lower portion of said baffle;
   (e) inlet means for delivering emulsion into said inlet chamber;
   (f) first outlet means for removing water from said water separation zone;
   (g) second outlet means for removing gas from said gas separation zone;
   (h) third outlet means for removing oil from said outlet chamber;
   (i) horizontally-elongated heater means residing in said inlet chamber in spaced relationship to said gas and water separation zone;
   (j) water sealed distributor means residing in said outlet chamber and extending horizontally substantially the length of said baffle, said distributor means having imperforate enclosing members extending downwardly into said water separation zone to define an open-bottom inlet zone and one of said enclosing members carrying horizontally aligned passage means for delivery of fluid from said inlet zone into said outlet chamber at a horizon spaced above the lower terminus of said one exterior member;
   (k) flow passage means interconnecting said inlet chamber with the inlet zone of said distributor whereby fluid from said inlet chamber is delivered into said distributor for passage through said passage means into said outlet chamber;

(l) means for establishing a high voltage electric field substantially throughout the horizontal length of said outlet chamber and said electric field interposed in fluid flowing from said passage means to said third outlet means; and (m) said baffle having passageways adjacent the bottom of said vessel to provide unobstructed flow of water between said inlet and outlet chambers in said water separation zone.

2. The separator of claim 1 wherein said water sealed distributor is an inverted trough having an open bottom and enclosing imperforate top and side members forming said inlet zone and said passage means are a plurality of like-sized round openings in one of said side members.

3. The separator of claim 1 wherein said water sealed distributor has enclosing members formed by a second baffle spaced equidistantly from said first inlet zone with an open top and bottom and said second baffle extending vertically from adjacent said gas separation zone downwardly into said water separation zone, and one of said baffles being said one member carrying said passage means for delivery of fluid from said inlet zone into said outlet chamber.

4. The separator of claim 1 wherein said water sealed distributor and third outlet means are positioned substantially horizontally on opposite sides of said means for establishing a high voltage field in said outlet chamber whereby fluid flowing from said passage means passes substantially horizontally through said electric field toward said third outlet means.

5. The separator of claim 1 wherein said means for establishing a high voltage field comprises spaced-apart vertical rod electrodes mounted in horizontally equal spacing patterns in said outlet chamber and adapted to receive energization from an external source of high potential for creating the high voltage field in the interelectrode space defined by said electrodes.

6. The separator of claim 1 wherein said means for establishing a high voltage field comprises spaced-apart upper and lower planar electrodes mounted horizontally in said outlet chamber and adapted to receive energization from an external source of high potential for creating the high voltage field in the interelectrode space defined by said electrodes.

7. The separator of claim 6 wherein said passage means of said distributor are positioned to introduce fluid immediately adjacent said lower planar electrode and said third outlet means resides in said vessel adjacent said upper planar electrode.

8. The separator of claim 1 wherein said inlet means comprises an emulsion distributor means residing adjacent said heater means and extending substantially the length thereof in said vessel and said distributor means carrying a plurality of openings for introducing the emulsion into said inlet chamber substantially uniformly along the length of said heater means.

9. The separator of claim 8 wherein said emulsion distributor means comprises an inverted trough mounted beneath said heater means, said trough having a water sealed emulsion inlet zone defined by an open bottom and imperforate enclosing members which members extend into said water separation zone, and at least one of said members carrying a plurality of horizontally aligned passage means for delivery of fluid from said emulsion inlet zone into said inlet chamber at a horizon spaced above comprises a first emulsion distributor mounted in said inlet chamber above said heater means, and open-bottomed shroud means enclosing said heater means into a fluid isolated heating zone, said shroud means formed with imperforate enclosing shroud members extending the lower terminus of said one member.

10. The separator of claim 1 wherein said inlet means into said water separation zone, and at least one of said shroud members carrying horizontally aligned passage means for delivery of fluid from said first emulsion distributor and about said shroud means and passage through said passage means into said heating zone into direct heat exchange flow about said heater means.

11. The separator of claim 10 wherein said flow passage means interconnect the isolated heating zone enclosing said heater means with the inlet zone of said distributor in said outlet zone.

12. The separator of claim 11 wherein said flow passage means comprises a plurality of individual passageways aligned in the horizontal in said vertical baffle for delivery of fluid from substantially the length of said heater means in said heating zone into said inlet zone of said distributor residing in said outlet chamber.

13. The separator of claim 1 wherein said baffle has passageways adjacent the top of said vessel to provide unobstructed flow of gas between said inlet and outlet chamber at a horizon above the electric field established in said outlet chamber.

14. The separator of claim 9 wherein said heater means extends longitudinally substantially throughout the length of said inlet chamber in said vessel.

15. The separator of claim 1 wherein said heater means extends longitudinally from each end of said vessel substantially throughout the length of said inlet chamber into a horizontally spaced-apart region forming an outlet zone in said inlet chamber defined by spaced-apart transverse baffles extending from a position spaced below said gas separation zone into said water separation zone whereby fluid flow from said heater means are at least partially diverted in passage to said outlet zone, and said flow passage means interconnecting said outlet zone of said inlet chamber with the inlet zone of said distributor residing in said outlet chamber.

16. The separator of claim 3 wherein said one of said first and second baffles has a horizontal portion extending from said baffles over said heater means and said horizontal portion forming one wall of said flow passage means interconnecting said inlet chamber with the inlet zone of said distributor residing in said outlet chamber.

17. A separator for oil-continuous emulsion containing gases and a dispersed water phase, said separator comprising:

(a) a closed horizontally-elongated vessel;
(b) a vertical non-pressure first baffle extending longitudinally throughout substantially the entire length of said vessel, said first baffle forming side-by-side inlet and outlet treating chambers;
(c) means for maintaining a gas separation zone extending longitudinally throughout substantially the entire length of said vessel, and said gas separation zone residing at least above said inlet chamber;
(d) means for maintaining a water separation zone extending longitudinally throughout substantially the entire length of said vessel, and said water separation zone residing below said inlet and outlet chambers and sealing the lower portion of said baffle;
(e) said first baffle having passageways adjacent the bottom of said vessel to provide unobstructed flow of water between said inlet and outlet chambers in said water separation zone;
(f) inlet means for delivering emulsion into said inlet chamber;
(g) first outlet means for removing water from said water separation zone;
(h) second outlet means for removing gas from said gas separation zone;
(i) third outlet means for removing oil from said outlet chamber;
(j) horizontally elongated heater means residing in said inlet chamber in spaced relationship to said gas and water separation zones;

(k) water sealed distributor means formed by a second non-pressure baffle and said second baffle extending vertically from adjacent said gas separation zone downwardly into said water separation zone, said baffles forming an inlet zone in said distributor means with an open top and bottom, one of said baffles carrying horizontally aligned passage means for delivery of fluid from said inlet zone into said outlet chamber at a horizon spaced above the lower terminus of said baffle carrying said passage means, and the other of said baffles having a horizontal portion extending from said baffles over said heater means in vertical spaced relationship to said gas separation zone;

(l) said spaced horizontal portion of said other baffles terminating in spaced relationship from the adjacent wall of said vessel and forming a flow passage means interconnecting said inlet chamber with said inlet zone between said baffles whereby fluid from said inlet chamber is delivered into said distributor for passage through said passage means into said outlet chamber;

(m) said inlet means comprising an inverted trough mounted beneath and coextensive in length with said heater means, said trough having a water sealed emulsion inlet zone defined by an open bottom and imperforate enclosing members which members extend into said water separation zone, and at least one of said members carrying a plurality of horizontally aligned passage means for delivery of fluid from said emulsion inlet zone into said inlet chamber at a horizon spaced from the lower terminus of said one member;

(n) means for establishing a high voltage electric field substantially throughout the horizontal length of said chamber; and (o) said passage means in said water sealed distributor positioned to deliver fluid at one side of said electric field and said third outlet carried in said vessel at the other side of said electric field whereby fluid flowing from said passage means passes through said electric field toward said third outlet.

18. The separator of claim 17 wherein said heater means extends longitudinally substantially throughout the length of said inlet chamber in said vessel.

19. The separator of claim 18 wherein said heater means is a U-shaped continuous tubing having leg portions extending from one end of said vessel to receive a flow of heating gases and a leg interconnection elbow adjacent the other end of said vessel.

20. The separator of claim 19 wherein said leg portions are mounted in superimposed relationship.

21. The separator of claim 17 wherein said means for establishing an electric field comprise spaced apart rows of vertically mounted rod electrodes and said electrodes adapted to receive energization from an external source of high potential for creating the high voltage field in the interelectrode space defined by the electrodes.

22. A separator for oil-continuous emulsions containing gases and a dispersed water phase, said separator comprising:

(a) a closed horizontally-elongated vessel;

(b) a vertical non-pressure baffle extending longitudinally throughout substantially the entire length of said vessel, said baffle forming side-by-side inlet and outlet treating chambers;

(c) means for maintaining a gas separation zone extending longitudinally throughout substantially the entire length of said vessel, and said gas separation zone residing above said inlet and outlet chambers;

(d) means for maintaining a water separation zone extending longitudinally throughout substantially the entire length of said vessel, and said water separation zone residing below said inlet and outlet separation chambers and sealing the lower portion of said baffle;

(e) said baffle having passageways adjacent the bottom of said vessel to provide unobstructed flow of water between said inlet and outlet chambers in said water separation zone;

(f) said baffle having passageway means adjacent the top of the vessel to provide unobstructed flow of gas between said inlet and outlet chambers in said gas separation zone;

(g) inlet means for delivering emulsion into said inlet chamber;

(h) first outlet means for removing water from said water separation zone;

(i) second outlet means for removing gas from said gas separation zone;

(j) third outlet means for removing oil from said outlet chamber;

(k) horizontally elongated heater means residing in said inlet chamber in spaced relationship to said gas and water separation zones, and said heater means extending at least from one end of said vessel substantially throughout said inlet chamber into a horizontally extending region forming an outlet zone in said inlet chamber defined by at least one transverse baffle extending from a position spaced below said gas separation zone into said water separation zone whereby fluid flow from said heater means is at least partially diverted by said transverse baffle in passage to said outlet zone of said inlet chamber;

(l) said inlet means comprising an emulsion distributor mounted in at least one end of said inlet chamber above at least a portion of said heater means, and an open-bottomed shroud means enclosing said heater means beneath each said emulsion distibutor into a fluid-isolated heating zone, said shroud means formed with imperforate enclosing shroud members extending into said water separation zone, and at least one of said shroud members carrying a plurality of horizontally aligned passage means for delivery of fluid from each said emulsion distributor about said shroud means and passage through said passage means into said heating zone into direct heat exchange flow about said heater means and then along said heater means about said transverse baffle into said outlet zone of said inlet chamber;

(m) a water sealed distributor means residing in said outlet chamber and extending substantially the length of said baffle, said distributor means being an inverted trough formed by said baffle as a first side member and enclosed by an imperforate top and a second side member extending downwardly into said water separation zone thereby forming an inlet zone with an open bottom sealed by said water separation zone, said second side member carrying horizontally aligned passage means for delivery of fluid from said inlet zone into said outlet chamber at a horizon spaced above the lower terminus of said second side member;

(n) said baffle having a flow passage means interconnecting said outlet zone formed by at least one said transverse baffle within said inlet chamber with the inlet zone of said distributor means whereby fluid from said inlet chamber is delivered into said distributor means for passage through said passage means into said outlet chamber; and (o) means for establishing a high voltage electric field substantially throughout the horizontal length of said outlet chamber and said electric field interposed in fluid flowing from said passage means of said distributor means toward said third outlet means.

23. The separator of claim 22 wherein said water sealed distributor and third outlet means are positioned substantially horizontally on opposite sides of said means for establishing a high voltage field in said outlet chamber whereby fluid flowing from said passage means passes substantially horizontally through said electric field toward said third outlet means.

24. The separator of claim 22 wherein said means for establishing a high voltage field comprises spaced-apart upper and lower planar electrodes mounted horizontally in said outlet chamber and adapted to receive energization from an external source of high potential for creating the high voltage field in the interelectrode space defined by said electrodes.

25. The separator of claim 24 wherein said upper planar electrode is a flat metal plate and said lower planar electrode is formed of a foraminous grid of metallic material.

26. The separator of claim 24 wherein said passage means of said distributor are positioned to introduce fluid immediately adjacent said lower planar electrode and said third outlet means resides in said vessel adjacent said upper planar electrode.

27. A separator for oil-continuous emulsions containing gases and a dispersed water phase, said separator comprising:

(a) a closed horizontally-elongated vessel;
(b) a vertical non-pressure first baffle extending longitudinally throughout substantially the entire length of said vessel, said baffle forming side-by-side inlet and outlet treating chambers;
(c) means for maintaining a gas separation zone extending longitudinally throughout substantially the entire length of said vessel, and said gas separation zone residing above said inlet and outlet chambers;
(d) means for maintaining a water separation zone extending longitudinally throughout substantially the entire length of said vessel, and said water separation zone residing below said inlet and outlet chambers and sealing the lower portion of said baffle;
(e) said first baffle having passageways adjacent the top of said vessel to provide unobstructed flow of gas between said inlet and outlet chambers in said gas separation zone;
(f) said first baffle having passageways adjacent the bottom of said vessel to provide unobstructed flow of water between said inlet and outlet separation chambers in said water separation zone;
(g) inlet means for delivering emulsion into said inlet chamber;
(h) first outlet means for removing water from said water separation zone;
(i) second outlet means for removing gas from said gas separation zone;
(j) third outlet means for removing oil from said outlet chamber;
(k) horizontally elongated heater means residing in said inlet chamber in spaced relationship to said gas and water separation zones, and said heater means extending substantially throughout said vessel;
(l) said inlet means comprising an emulsion distributor in said inlet chamber mounted above and coextensive in length with said heater means, and an open-bottomed shroud means enclosing said heater means beneath said emulsion distributor into a fluid isolated heating zone, said shroud means formed with imperforate enclosing shroud members extending into said water separation zone, and at least one of said shroud members carrying a plurality of horizontally aligned passage means for delivery of fluid from said emulsion distributor about said shroud means in an indirect heat exchange flow and passage through said passage means into said heating zone into direct heat exchange flow about said heater means;
(m) a water sealed distributor means formed by a second non-pressure baffle spaced equidistantly from said first baffle and said second baffle extending vertically from adjacent said gas separation zone downwardly into said water separation zone, said baffle forming an inlet zone in said distributor means with an open top and bottom, one of said baffles carrying horizontally aligned passage means for delivery of fluid from said inlet zone into said outlet chamber at a horizon spaced above the lower terminus of said baffle carrying said passage means, and the other of said baffles having a plurality of individual passageways aligned in the horizontal for delivery of fluid from substantially the length of said heater means in said heating zone into said inlet zone of said distributor means residing in said outlet chamber; and
(n) means for establishing a high voltage electric field substantially throughout the horizontal length of said outlet chamber and said electric field interposed in fluid flowing from said passage means of said distributor means toward said third outlet means.

28. The separator of claim 27 wherein said water sealed distributor and third outlet means are positioned substantially horizontally on opposite sides of said means for establishing a high voltage field in said outlet chamber whereby fluid flowing from said passage means passes substantially horizontally through said electric field toward said third outlet means.

29. The separator of claim 27 wherein said means for establishing a high voltage field comprises spaced-apart upper and lower planar electrodes mounted horizontally in said outlet chamber and adapted to receive energization from an external source of high potential for creating the high voltage field in the interelectrode space defined by said electrodes.

30. The separator of claim 29 wherein said upper planar electrode is a flat metal plate and said lower planar electrode is formed of a foraminous grid of metallic material.

31. The separator of claim 29 wherein said passage means of said distributor are positioned to introduce fluid immediately adjacent said lower planar electrode and said third outlet means resides in said vessel adjacent said upper planar electrode.

References Cited

UNITED STATES PATENTS

| | | | |
|---|---|---|---|
| 3,476,678 | 11/1969 | Murdock | 204—302 |
| 3,458,429 | 7/1969 | Watson et al. | 204—302 |
| 3,432,991 | 3/1969 | Sauder et al. | 204—308 X |
| 3,347,773 | 10/1967 | Turner | 204—308 X |

JOHN H. MACK, Primary Examiner

N. A. KAPLAN, Assistant Examiner

U.S. Cl. X.R.

204—188, 308

UNITED STATES PATENT OFFICE
CERTIFICATE OF CORRECTION

Patent No. 3,649,516              Dated March 14, 1972

Inventor(s) Ernest A. Cole, Jr., Frederick D. Watson and Weldon D. Mayse

It is certified that error appears in the above-identified patent and that said Letters Patent are hereby corrected as shown below:

Column 7, line 43, for "residul" read ---residual---;

Column 8, line 50, for "is on" read ---in one---;

Column 9, line 37, for "zone 9" read ---zone 91---;

Column 10, line 2, for "distribtuors" read ---distributors---;

Column 15 (claim 9), lines 68-73, cancel the text "comprises a first ++++ shroud members extending";

Column 15 (claim 10) after line 75 and before column 16, line 1, insert the text --- comprises a first emulsion distributor mounted in said inlet chamber above said heater means, and open-bottomed shroud means enclosing said heater means into a fluid isolated heating zone, said shroud means formed with imperforate enclosing shroud members extending---;

Column 16 (claim 11), line 10, after "distributor" insert ---residing---; an

Column 17 (claim 17), line 34, before "chamber" insert ---outlet---.

Signed and sealed this 29th day of August 1972.

(SEAL)
Attest:

EDWARD M. FLETCHER, JR.
Attesting Officer

ROBERT GOTTSCHALK
Commissioner of Patents